(12) United States Patent
Chung et al.

(10) Patent No.: US 10,003,199 B2
(45) Date of Patent: Jun. 19, 2018

(54) BATTERY ENERGY STORAGE SYSTEM

(71) Applicant: LSIS CO., LTD., Anyang-si, Gyeonggi-do (KR)

(72) Inventors: Yong Ho Chung, Ansan-si (KR); Byung Kwan Kang, Seoul (KR); Ah Ryeon Park, Yongin-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 274 days.

(21) Appl. No.: 14/986,171

(22) Filed: Dec. 31, 2015

(65) Prior Publication Data
US 2016/0233674 A1   Aug. 11, 2016

(30) Foreign Application Priority Data

Feb. 11, 2015 (KR) .................. 10-2015-0021008

(51) Int. Cl.
*H02J 3/04* (2006.01)
*H02M 7/44* (2006.01)
*H02J 3/38* (2006.01)
*H02J 3/32* (2006.01)

(52) U.S. Cl.
CPC .............. *H02J 3/383* (2013.01); *H02J 3/32* (2013.01); *H02J 3/386* (2013.01); *Y02E 10/563* (2013.01); *Y02E 10/566* (2013.01); *Y02E 10/763* (2013.01); *Y02E 40/10* (2013.01); *Y02E 70/30* (2013.01)

(58) Field of Classification Search
CPC combination set(s) only.
See application file for complete search history.

(56) References Cited

U.S. PATENT DOCUMENTS

| | | | |
|---|---|---|---|
| 8,259,478 B2 | 9/2012 | J'Neva Devi et al. | |
| 9,209,643 B2* | 12/2015 | Nishikawa | H01M 10/441 |
| 9,651,971 B2* | 5/2017 | Miyamoto | G05F 1/66 |
| 9,735,619 B2* | 8/2017 | Inoue | H02J 9/062 |
| 2013/0088900 A1 | 4/2013 | Park | |
| 2017/0070084 A1* | 3/2017 | Matsumoto | H02J 3/32 |

FOREIGN PATENT DOCUMENTS

| | | |
|---|---|---|
| CC | 103036243 A | 4/2013 |
| CN | 202651806 U | 1/2013 |
| JP | 2001-177995 | 6/2001 |

(Continued)

OTHER PUBLICATIONS

Korean Intellectual Property Office Application Serial No. 10-2015-0021008, Office Action dated Dec. 28, 2015, pages.

(Continued)

Primary Examiner — An Luu
(74) Attorney, Agent, or Firm — K&L Gates LLP

(57) ABSTRACT

A power supply system includes: an electricity generation device configured to generate electrical energy; a plurality of DC/AC converters configured to convert the electrical energy into AC; and a battery energy storage system (BESS) configured to receive and charge the electrical energy and supplies the electrical energy to the plurality of DC/AC converters by discharging the charged electrical energy. The electrical energy generated by the electricity generation device charges the BESS without going through the plurality of DC/AC converters.

6 Claims, 9 Drawing Sheets

(56) References Cited

FOREIGN PATENT DOCUMENTS

| | | |
|---|---|---|
| JP | 2005341634 | 12/2005 |
| JP | 2011069398 A | 4/2011 |
| JP | 2013085459 | 5/2013 |
| KR | 10-2011-0069398 | 6/2011 |
| KR | 10-2011-0123130 | 11/2011 |
| KR | 10-2011-0132122 | 12/2011 |

OTHER PUBLICATIONS

Japan Patent Office Application Serial No. 2015-248295, Office Action dated Nov. 22, 2016, 2 pages.
Chinese Office Action for related Chinese Application No. 201610041797.9; action dated Nov. 3, 2017; (6 pages).

* cited by examiner

BATTERY ENERGY STORAGE SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0021008, filed on Feb. 11, 2015, the contents of which are all hereby incorporated by reference herein in its entirety.

BACKGROUND

The present disclosure relates to a power supply system including a Battery Energy Storage System (BESS).

Since electrical energy is easily transferred and converted, it is widely used. In order to use such electrical energy efficiently, a BESS is used. The BESS receive power and is charged. Additionally, when power is required, the BESS supplies the power by discharging charged power. Through this, the BESS supplies power flexibly.

In detail, when an electricity generation system includes a BESS, it operates as follows. When a load or a system is overloaded, the BESS discharges stored electrical energy. Additionally, when a load or a system is lightly loaded, the BESS receive power from an electricity generation device or system and is changed.

Additionally, if the BESS exists independently regardless of an electricity generation system, the BESS receives idle power from an external power supply source and is charged. Additionally, when a system or a load is overloaded, the BESS supplies power by discharging charged power.

SUMMARY

Embodiments provide a power supply system for improving power conversion efficiency by efficiently adjusting power supplied to a DC/AC converter.

In one embodiment, a power supply system includes: an electricity generation device configured to generate electrical energy; a plurality of DC/AC converters configured to convert the electrical energy into AC; and a battery energy storage system (BESS) configured to receive and charge the electrical energy and supplies the electrical energy to the plurality of DC/AC converters by discharging the charged electrical energy, wherein the electrical energy generated by the electricity generation device charges the BESS without going through the plurality of DC/AC converters.

The power supply system may further include a system control unit configured to determine the number of driving DC/AC converters by comparing a size of a DC power supplied by the BESS with a size of a reference power, determine a DC/AC converter to be driven in correspondence to the number of the driving DC/AC converters among the plurality of DC/AC converters, and drive the DC/AC converter to be driven.

The reference power may be determined based on a rated power of a first DC/AC converter that is one of the plurality of DC/AC converters.

The reference power may have a size of supply power for the first DC/AC converter, which allows the first DC/AC converter to use a power of 70% to 90% of the rated power of the first DC/AC converter.

The system control unit simultaneously may drive a first DC/AC converter and a second DC/AC converter in the plurality of DC/AC converters when a DC power supplied by the electricity generation device exceeds the reference power.

The system control unit may drive only one of the plurality of DC/AC converters when a DC power supplied by the electricity generation device does not exceed the reference power.

The power supply system may further include a DC/DC converter configured to convert a voltage size of electrical energy for charging the battery energy system as connected to the BESS.

The details of one or more embodiments are set forth in the accompanying drawings and the description below. Other features will be apparent from the description and drawings, and from the claims.

DETAILED DESCRIPTION OF THE EMBODIMENTS

Figure 1:
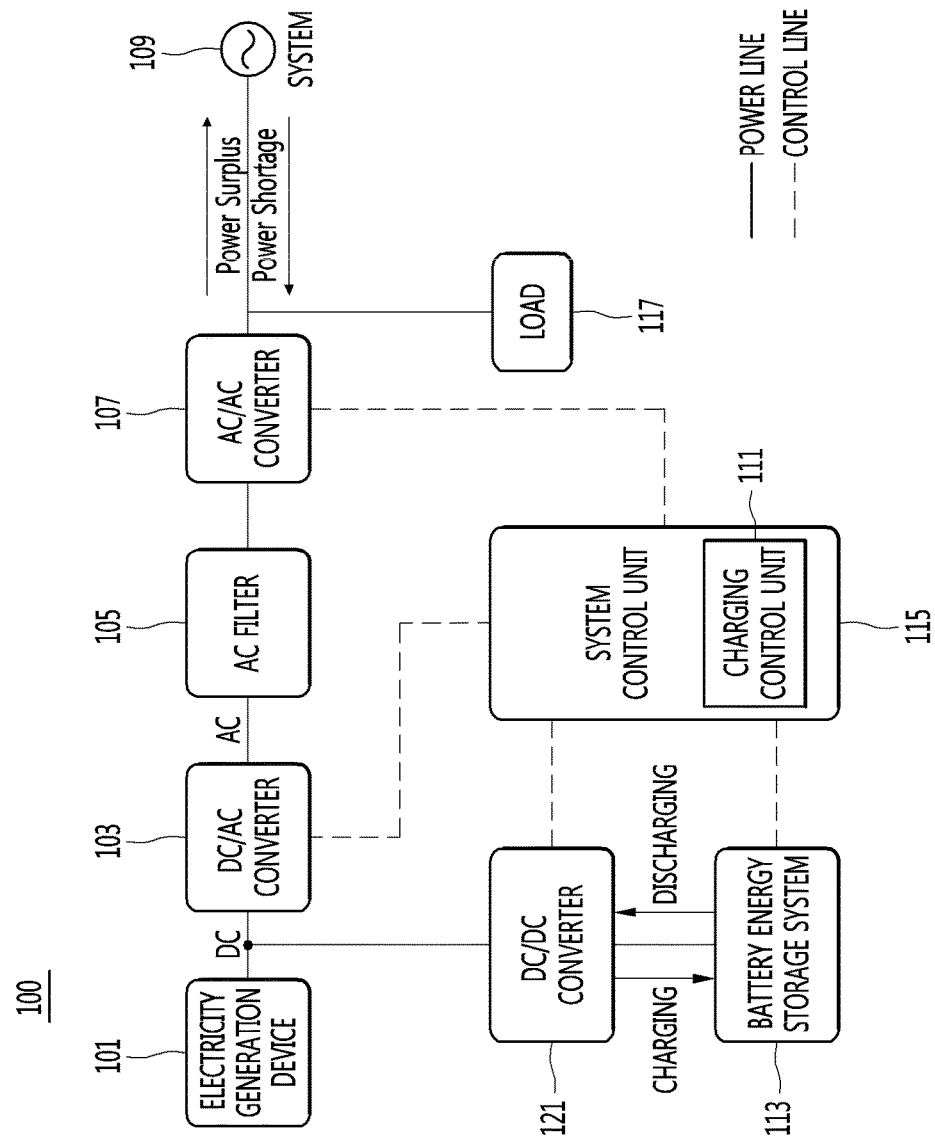
FIG. 1 is a block diagram illustrating a power supply system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

Hereinafter, a power supply system according to an embodiment of the present invention is described with reference to FIGS. 1 to 3.

FIG. 1 is a block diagram illustrating a power supply system according to an embodiment of the present invention.

A power supply system 100 according to an embodiment of the present invention includes an electricity generation device 101, a DC/AC converter 103, an AC filter 105, an AC/AC converter 107, a system 109, a charging control unit 111, a Battery Energy Storage System (BESS) 113, a system control unit 115, a load 117, and an DC/DC converter 121.

The electricity generation device 101 generates electrical energy. If the electricity generation device 101 is a photovoltaic device, it may be a solar cell array. The solar cell array combines a plurality of solar cell modules. The solar cell module is a device for generating a predetermined voltage and current by converting solar energy into electrical energy as connecting a plurality of solar cells in serial or parallel. Accordingly, the solar cell array absorbs solar energy and converts it into electrical energy. Additionally, when an electricity generation system is a wind power generation system, the electricity generation device 101 may be a fan for converting wind power energy into electrical energy. However, as mentioned above, the power supply system 100 may supply power through only the BESS 113 without the electricity generation device 101. In this case, the power supply system 100 may not include the electricity generation device 101.

The DC/AC converter 103 converts DC power into AC power. DC power supplied by the electricity generation device 101 or DC power discharged by the BESS 113 is converted into AC power.

The AC filter 105 filters the noise of power converted into AC power. According to a specific embodiment of the present invention, the AC filter 105 may be omitted.

The AC/AC converter 107 converts the voltage size of AC power where noise is filtered and supplies power to the system 109 or an independent load, in order to supply AC power to the system 109 or the load 117. According to a specific embodiment of the present invention, the AC/AC converter 107 may be omitted.

The system 109 is a system where many power plants, substations, transmission and distribution lines, and loads are integrated to generate and use power.

The load 117 consumes power by receiving electrical energy from an electricity generation system. The BESS 113 receives electronic energy from the electricity generation device 101 and performs charging, or discharge the charged electrical energy according to a power supply situation of the system 109 or the load 117. In more detail, when the system 109 or the load 117 is lightly loaded, the BESS 113 receives idle power from the electricity generation device 101 and performs charging. When the system 109 or the load 117 is overloaded, the BESS 113 discharges the charged power to supply it to the system 109 or the load 117. A power supply situation of the system 109 or the load 117 may have a great difference for each time slot. Accordingly, it is inefficient for the power supply system 100 to supply power supplied by the electricity generation device 101 uniformly without consideration on a power supply situation of the system 109 or the load 117. Therefore, the power supply system 100 adjusts the amount of power supply according to a power supply situation of the system 109 or the load 117 by using the BESS 113. Through this, the power supply system 100 may efficiently supply power to the system 109 or the load 117.

The DC/DC converter 121 converts the size of DC power supplied or received by the BESS 113. According to a specific embodiment of the present invention, the DC/DC converter 121 may be omitted.

The system control unit 115 controls operations of the DC/AC converter 103 and the DC/DC converter 107. Additionally, the system control unit 115 may include the charging control unit 111 for controlling charging and discharging of the BESS 113. The charging control unit 111 controls charging and discharging of the BESS 113. When the system 109 or the load 117 is overloaded, the charging control unit 111 allows the BESS 113 to supply power and deliver it to the system 109 or the load 117. When the system 109 or the load 117 is lightly loaded, the charging control unit 111 allows an external power supply source or the electricity generation device 101 to supply power and deliver it to the BESS 113.

Figure 2:
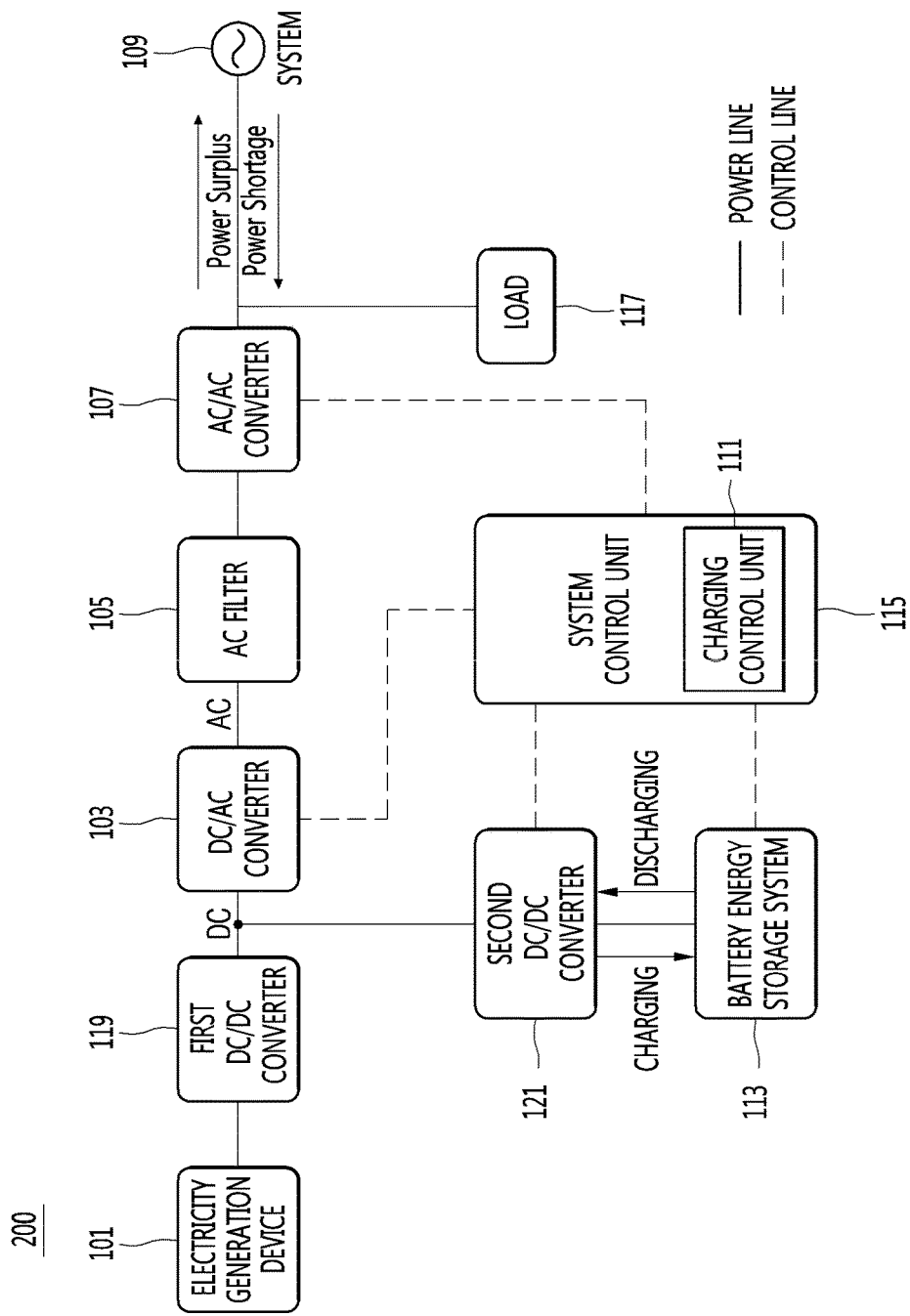
FIG. 2 is a block diagram illustrating a small-capacity power supply system according to an embodiment of the present invention.

FIG. 2 is a block diagram illustrating a small-capacity power supply system according to an embodiment of the present invention.

A small-capacity power supply system 200 according to an embodiment of the present invention includes an electricity generation device 101, a DC/AC converter 103, an AC filter 105, an AC/AC converter 107, a system 109, a charging control unit 111, a BESS 113, a system control unit 115, a first DC/DC converter 119, a load 117, and a second DC/DC converter 121.

This is identical to the embodiment of FIG. 1 but further includes the first DC/DC converter 119. The first DC/DC converter 119 converts the voltage of DC power generated by the electricity generation device 101. In relation to the small-capacity power supply system 200, the voltage of the power generated by the electricity generation device 101 is small. Accordingly, it is necessary to boost the voltage in order to input the power supplied by the electricity generation device 101 into the DC/AC converter 103. The first DC/DC converter 119 converts the voltage size of the power generated by the electricity generation device 101 into the voltage size to be inputted to the DC/AC converter 103.

Figure 3:
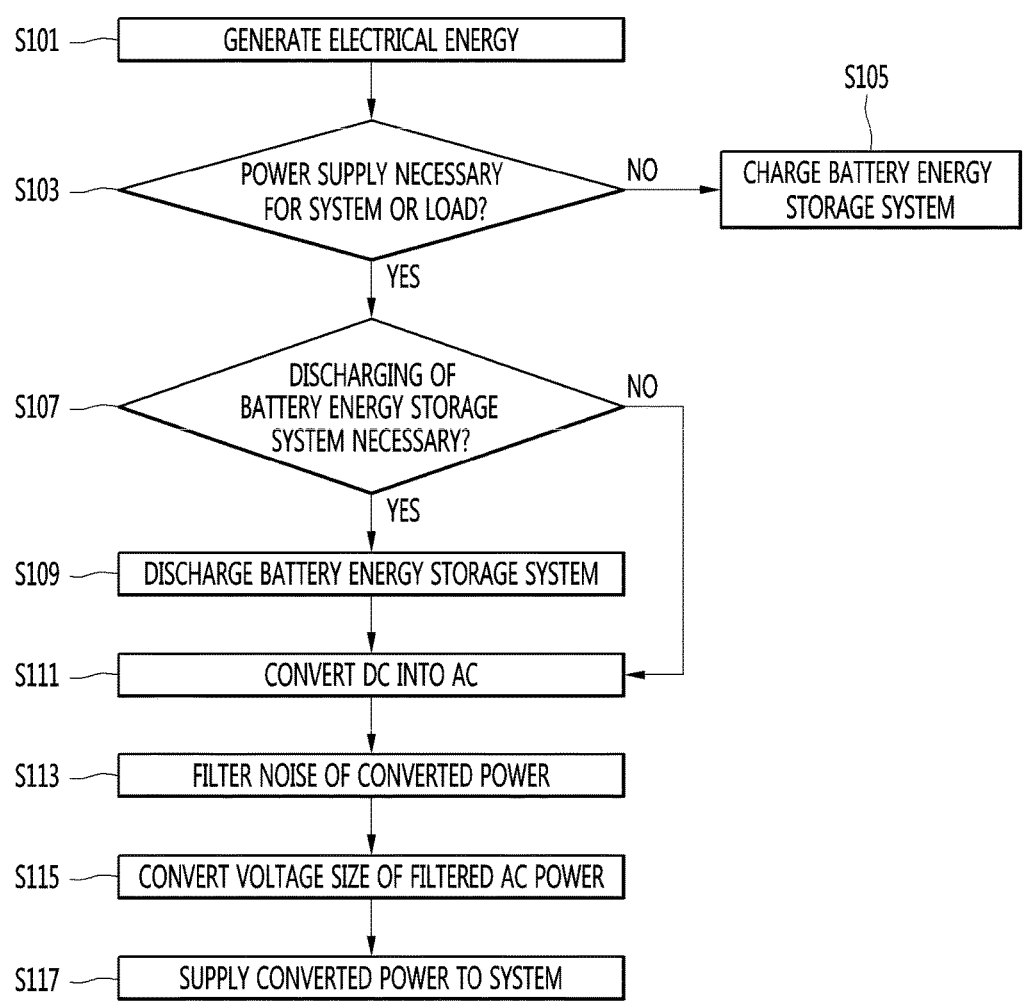
FIG. 3 is an operation flowchart of a power supply system according to an embodiment of the present invention.

FIG. 3 is an operation flowchart of a power supply system including an electricity generation device according to an embodiment of the present invention.

The electricity generation device 101 generates electrical energy in operation S101. According to a specific embodiment of the present invention, when the electricity generation device 101 is a solar cell array, it converts solar energy into electrical energy. According to a specific embodiment of the present invention, when the electricity generation device 101 is a fan, it converts wind power energy into electrical energy.

The charging control unit 111 determines whether power supply is required for the system 109 or the load 117 in operation S103. Whether power supply is required for the system 109 or the load 117 may be determined on the base of whether the system 109 or the load 117 is overloaded or lightly overloaded.

If power supply is not required for the system 109 or the load 117, the charging control unit 111 charges the BESS 113 in operation S105.

The charging control unit 111 determines whether discharging of the BESS 113 is required in operation S107. As the power demand of the system 109 or the load 117 is not satisfied with only the electrical energy supplied by the electricity generation device 101, whether discharging of the BESS 113 is required is determined. Additionally, the charging control unit 111 may determine whether the BESS 113 stores electrical energy sufficient for discharging.

If discharging of the BESS 113 is required, the charging control unit 111 discharges the BESS 113 in operation S109.

The DC/AC converter 103 converts electrical energy discharged by the BESS 113 and electrical energy generated by the electricity generation device 101 into AC in operation S111. At this point, the power supply system 100 converts all of electrical energy discharged by the BESS 113 and electrical energy generated by the electricity generation device 101 from DC to AC through one DC/AC converter 103. Each electric appliance has a limitation in using power. This limitation includes an instantaneous limitation and a limitation in the use for a long time and a rated power is defined by the maximum power that is used easily without damaging a device even in the use for a long time. In order to maximize the efficiency of the DC/AC converter 103, the BESS 113 and the electricity generation device 101 are required to supply power so that the DC/AC converter 103 uses 70% to 90% of such a rated power.

The AC filter 105 filters the noise of power converted into AC in operation S113. As described above, according to a specific embodiment of the present invention, a noise filtering operation may be omitted.

The AC/AC converter 107 converts the voltage size of the filtered AC power and supplies power to the system 109 or the load 117 in operation S115. As described above, according to a specific embodiment of the present invention, converting by the AC/AC converter 107 may be omitted.

The power supply system 100 supplies the converted power to the system 109 or the load 117 in operation S117.

Since the power supply system 100 uses only one DC/AC converter 103 according to the embodiments of FIGS. 1 to 3, if the power supply system 100 is designed by determining a rated power of the DC/AC converter 103 in correspondence to the capacity of the electricity generation device 101, it has the following issue. If the BESS 113 is discharged to supply electrical energy together with the electricity generation device 101, since the DC/AC converter 103 uses a power exceeding 70% to 90% of the rated power, the efficiency of the DC/AC converter 103 may be maximized. Alternatively, if the BESS 113 is discharged to supply electrical energy alone, since the DC/AC converter 103 uses a power less than 70% to 90% of the rated power, the efficiency of the DC/AC converter 103 may be maximized. Besides that, if the power supply system 100 uses natural energy such as solar light and wind power with a large fluctuation in a generated power amount, the efficiency of the DC/AC converter 103 may not be maximized. For example, in the case that the BESS 100 uses a solar power generation system, when the electricity generation device 101 supplies a small amount of electrical energy due to less solar radiation, since the DC/AC converter 103 uses a power less than 70% to 90% of the rated power, the efficiency of the DC/AC converter 103 may not be maximized. Accordingly, the electrical energy generation efficiency of the power supply system 100 is deteriorated. Additionally, a Total Harmonic Distortion (THD) of power is increased, so that the quality of power generated by the power supply system is deteriorated.

Figure 4:
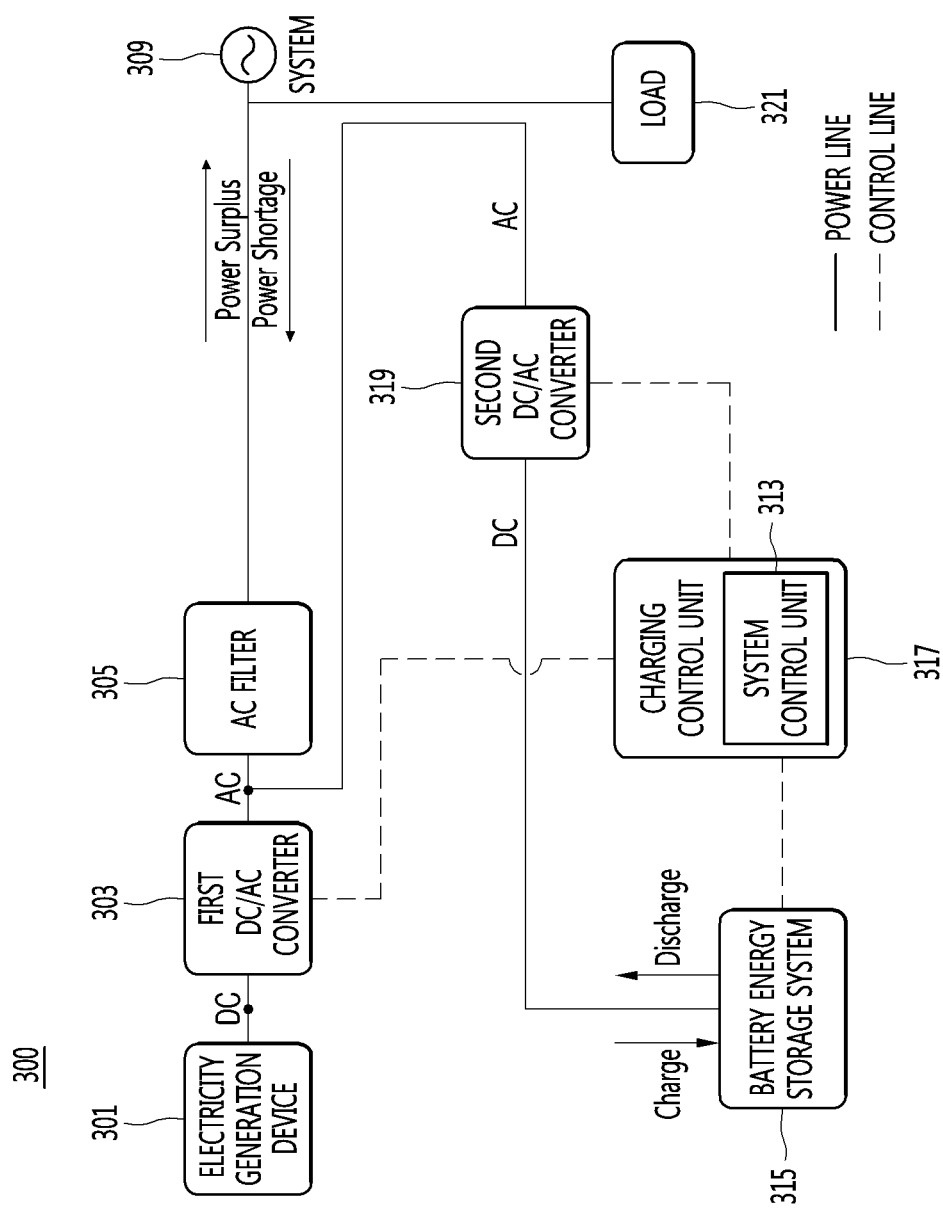
FIG. 4 is a block diagram illustrating a power supply system according to another embodiment of the present invention.

FIG. 4 is a block diagram illustrating a power supply system according to another embodiment of the present invention.

A power supply system 300 according to another embodiment of the present invention includes an electricity generation device 301, a first DC/AC converter 303, an AC filter 305, a system 309, a charging control unit 313, a BESS 315, a system control unit 317, a second DC/AC converter 319, and a load 321.

The electricity generation device 301 generates electrical energy. When the power supply system 300 is a solar power supply system, the electricity generation device 301 may be a solar cell array. The solar cell array combines a plurality of solar cell modules. The solar cell module is a device for generating a predetermined voltage and current by converting solar energy into electrical energy as connecting a plurality of solar cells in serial or parallel. Accordingly, the solar cell array absorbs solar energy and converts it into electrical energy.

The first DC/AC converter 303 converts DC power into AC power. The first DC/AC converter 303 receives DC power and converts it into AC power.

The AC filter 305 filters the noise of power converted into AC power. According to a specific embodiment of the present invention, the AC filter 305 may be omitted.

The system 309 is a system where many power plants, substations, transmission and distribution lines, and loads are integrated to generate and use power.

The load 321 consumes power by receiving electrical energy from a power supply system.

When the system 309 or the load 321 is lightly loaded, the BESS 113 receives idle power from the electricity generation device 301 and performs charging. When the system 309 or the load 321 is overloaded, the BESS 315 discharges the charged power to supply it to the system 309 or the load 321. As described in the embodiments of FIGS. 1 to 3, the power supply system 300 may efficiently supply power to the system 309 or the load 321 by using the BESS 315. The system control unit 317 controls operations of the first DC/AC converter 303 and the second DC/AC converter 319. The system control unit 317 may include the charging control unit 313. The charging control unit 313 controls charging and discharging of the BESS 315. When the system 309 or the load 321 is overloaded, the charging control unit 313 allows the BESS 315 to supply power and deliver it to the system 309 or the load 321. At this point, it is necessary to boost the voltage in order to input the power supplied by the electricity generation device 313 into the DC/AC converter 319. When the system 309 or the load 321 is lightly loaded, the charging control unit 313 receives power from the electricity generation device 301 and delivers it to the BESS 315. In more detail, the first DC/AC converter 301 converts DC power supplied from the electricity generation device 301 into AC power. At this point, the second AC/DC converter 319 may convert the converted AC power into DC power again. At this point, the charging control unit 313 may charge the BESS 315 with DC power.

Figure 5:
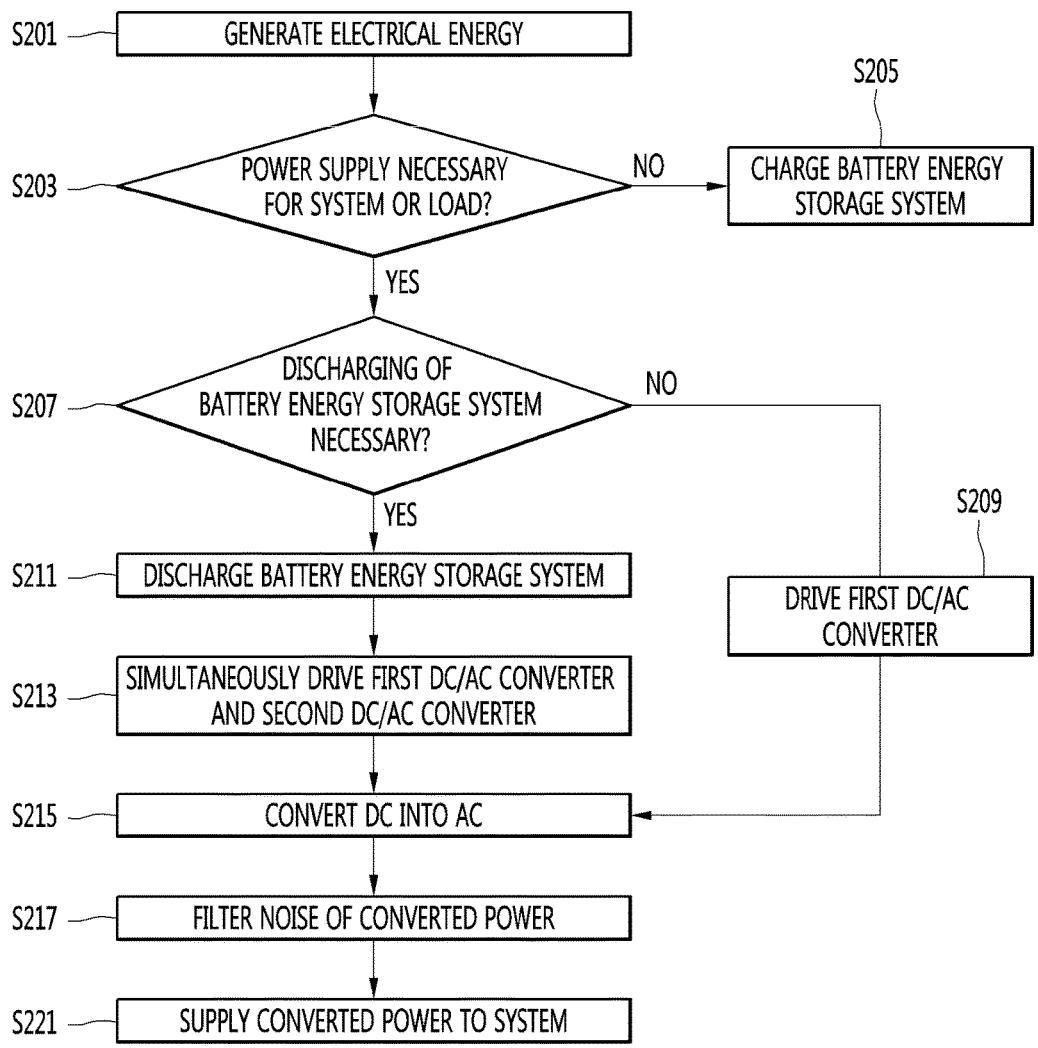
FIG. 5 is an operation flowchart of a power supply system according to another embodiment of the present invention.

Unlike the embodiments of FIGS. 1 to 3, according to embodiment of FIGS. 4 and 5, the power supply system 300 includes a plurality of DC/AC converters. Especially, the power supply system 300 further includes the second DC/AC converter 319 connected to the BESS 315.

The second DC/AC converter 319 converts DC power into AC power. The second DC/AC converter 319 converts DC power discharged by the BESS 315 into AC power. Besides the first DC/AC converter 303, by including the second DC/AC converter 319, the power supply system 300 may improve the efficiency of the entire power conversion by simultaneously driving the first DC/AC converter 303 and the second DC/AC converter 319. Especially, if the rated power of the first DC/AC converter 303 is determined based on an average power amount supplied by the electricity generation device 301 and the rated power of the second DC/AC converter 319 is determined based on an average power amount supplied by the BESS 315, energy conversion efficiency may be improved. A specific operation of the power supply system 300 according to another embodiment of the present invention will be described with reference to FIG. 5.

FIG. 5 is an operation flowchart of a power supply system according to another embodiment of the present invention.

The electricity generation device 301 generates electrical energy in operation S201. However, if the power supply system 300 does not include the electricity generation device 301, such an operation may be omitted.

The charging control unit 313 determines whether power supply is required for the system 309 or the load 321 in operation S203. Whether power supply is required for the system 309 or the load 321 may be determined on the base of whether the system 309 or the load 321 is overloaded or lightly overloaded.

If power supply is not required for the system 309 or the load 321, the charging control unit 313 charges the BESS 315 in operation S205.

If power supply is required for the system 309 or the load 321, the charging control unit 313 determines whether discharging of the BESS 315 is required in operation S207. As the power demand of the system 309 or the load 321 is not satisfied with only the electrical energy supplied by the electricity generation device 301, whether discharging of the BESS 300 is required is determined. However, if the power supply system 100 does not include the electricity generation device 101, such a determination may be omitted. Additionally, the charging control unit 313 may determine whether the BESS 315 stores electrical energy sufficient for discharging.

If discharging of the BESS 315 is not required, the system control unit 317 drives only the first DC/AC converter 303. Since the BESS 315 does not perform discharging, the driving of the second DC/AC converter 319 is not required.

If discharging of the BESS 315 is required, the charging control unit 313 discharges the BESS 315 in operation S211.

The system control unit 517 drives the first DC/AC converter 303 and the second DC/AC converter 319 at the same time in operation S213.

The driven one among the first DC/AC converter 303 and the second DC/AC converter 319 converts electrical energy into AC in operation S215.

The AC filter 305 filters the noise of converted power in operation S217. As described above, according to a specific embodiment of the present invention, a noise filtering operation may be omitted.

The power supply system 300 supplies the filtered power to a system in operation S221.

Such a power supply system 300 may improve power conversion efficiency by using a plurality of DC/AC converters. However, according to the embodiments of FIGS. 4 and 5, the BESS 315 is not charged immediately with power supplied by the electricity generation device 301 and therefore, the power is converted into AC power through the first DC/AC converter 303 and then, is converted into DC power through the second DC/AC converter 319. Accordingly, a power supply system for efficiently charging the BESS 315 is required. Additionally, even if the rated power of each of a plurality of DC/AC converters is determined based on an average power amount supplied by the electricity generation device 301 and an average power amount supplied by the BESS 315, if the power supply system 300 uses a solar electricity generation or wind electricity generation, of which electricity generation amount is changed according to weather and time, it is difficult to operate in correspondence to a power amount of a rated power of a plurality of DC/AC converters. Accordingly, a power supply system including a plurality of DC/AC converters and configured to selectively drive them on the basis of a reference power value is required.

Hereinafter, a power supply system according to another embodiment of the present invention is described with reference to FIGS. 6 to 11.

Figure 6:
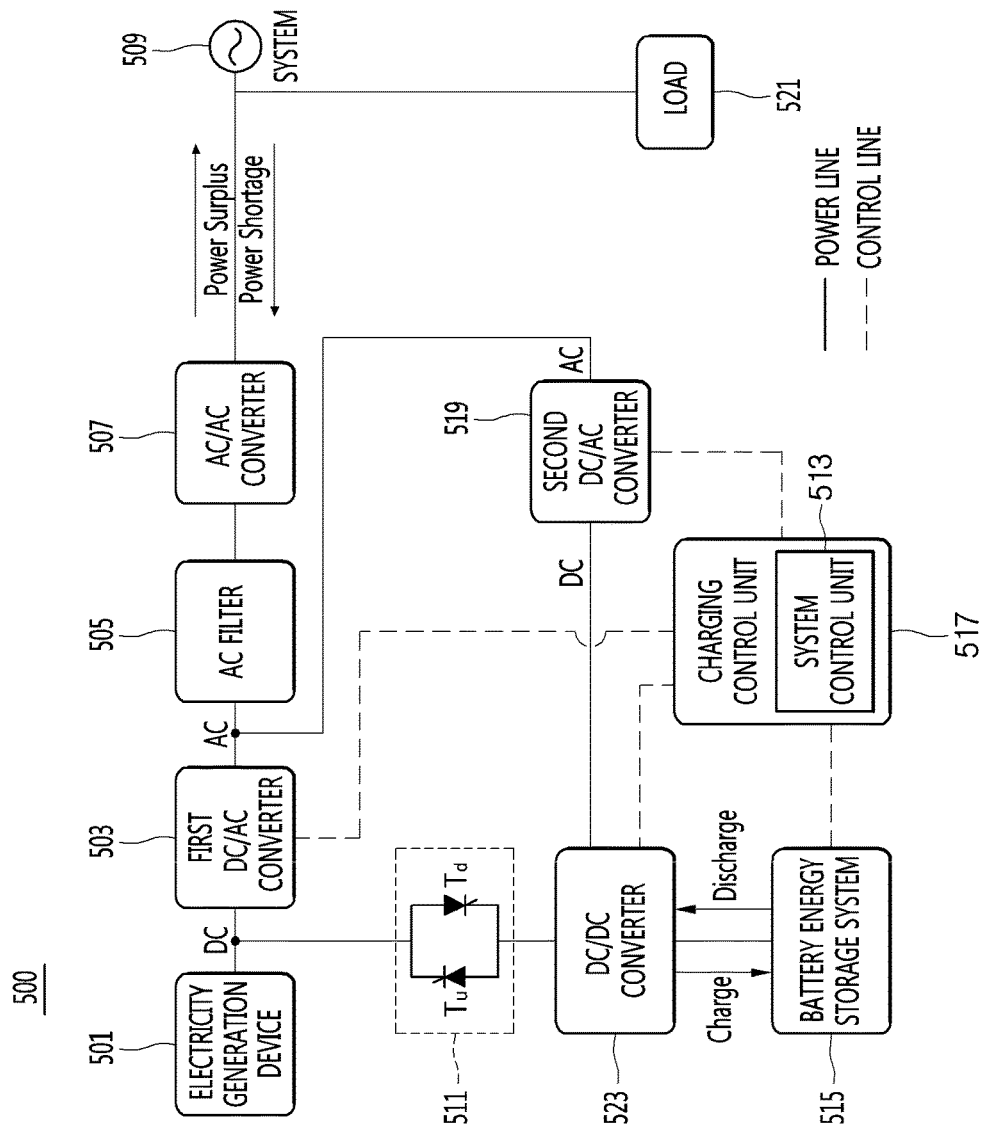
FIG. 6 is a block diagram illustrating a power supply system according to another embodiment of the present invention.

FIG. 6 is a block diagram illustrating a power supply system according to another embodiment of the present invention.

A power supply system 500 according to another embodiment of the present invention includes an electricity generation device 501, a first DC/AC converter 503, an AC filter 505, a system 509, a control switch 511, a charging control unit 513, a BESS 515, a system control unit 517, a second DC/AC converter 519, a load 521, and a DC/DC converter 523.

The electricity generation device 501 generates electrical energy. When the power supply system 500 is a solar electricity generation device, the electricity generation device 301 may be a solar cell array. The solar cell array combines a plurality of solar cell modules. The solar cell module is a device for generating a predetermined voltage and current by converting solar energy into electrical energy as connecting a plurality of solar cells in serial or parallel. Accordingly, the solar cell array absorbs solar energy and converts it into electrical energy.

The first DC/AC converter 503 converts DC power into AC power. DC power supplied by the electricity generation device 501 or DC power discharged by the BESS 515 is converted into AC power.

The AC filter 505 filters the noise of power converted into AC power. According to a specific embodiment of the present invention, the AC filter 505 may be omitted.

The system 509 is a system where many power plants, substations, transmission and distribution lines, and loads are integrated to generate and use power.

The load 521 consumes power by receiving electrical energy from a power supply system.

Unlike the embodiments of FIGS. 4 and 5, according to the embodiment of FIG. 6, in relation to the power supply system 500, the BESS 515 is directly connected to the electricity generation device 501. In more detail, the power supply system 500 may further include the control switch 511 for adjusting the flow of power supply between the BESS 515 and the electricity generation device 501. Accordingly, the electrical energy generated by the electricity generation device 501 charges the BESS 515 without going through the first DC/AC converter 503 and the second DC/AC converter 519.

The control switch 511 adjusts the flow of power supply between the BESS 515, the electricity generation device 501, and the first DC/AC converter 503. In more detail, when the BESS 515 is discharged to supply power to the first DC/AC converter 503, the control switch 511 connects the BESS 515 and the first DC/AC converter 503. When power is not supplied to the first DC/AC converter 503, the control switch 511 release the connection between the first DC/AC converter 503 and the BESS 515 by receiving a control signal.

When the system 509 or the load 521 is lightly loaded, the BESS 515 receives idle power from the electricity generation device 501 and performs charging. When the system 509 or the load 521 is overloaded, the BESS 515 discharges the charged power to supply it to the system 509 or the load 521. As described in the embodiments of FIGS. 1 to 5, the power supply system 500 may efficiently supply power to the system 509 or the load 521 by using the BESS 515.

The DC/DC converter 523 converts the size of DC power supplied or received by the BESS 513. The DC/DC converter 523 may receive DC power directly from the electricity generation device 501 and perform charging by converting the size of DC power supplied from the electricity generation device 501. The voltage size of DC power generated by the electricity generation device 501 is different from a voltage size necessary for charging the BESS 513. The DC/DC converter 523 adjusts such a voltage difference. Through this, the power supply system 500 may charge the BESS 513 directly with DC power generated by the electricity generation device 501. According to a specific embodiment of the present invention, the DC/DC converter 523 may be omitted.

The system control unit 517 controls operations of the first DC/AC converter 503, the second DC/AC converter 519, the AC filter 505, the AC/AC converter 507, and the DC/DC converter 523. The system control unit 517 may include the charging control unit 513. The charging control unit 513 controls charging and discharging of the BESS 515. When the system 509 or the load 521 is overloaded, the charging control unit 513 allows the BESS 515 to supply power and deliver it to the system 509 or the load 521. At this point, the charging control unit 513 may allow the BESS 515 to supply power to one of the first DC/AC converter 503 and the second DC/AC converter 519 or both of them simultaneously. When the system 509 or the load 521 is lightly loaded, the charging control unit 513 receives power from the electricity generation device 501 and delivers it to the BESS 515.

The first DC/AC converter 503 and the second DC/AC converter 519 convert DC power into AC power. DC power discharged by the BESS 515 is converted into AC power. As including the control switch 511, the power supply system 500 may charge the BESS 515 directly without converting DC power supplied by the electricity generation device 501 into AC power. Additionally, as including a plurality of DC/AC converters and the control switch 511, the power supply system 500 may selectively drive the plurality of DC/AC converters on the basis of a size of power supplied. Selectively driving a plurality of DC/AC converters on the basis of power supplied by the power supply system 500 will be described in detail with reference to FIG. 7.

Figure 7:
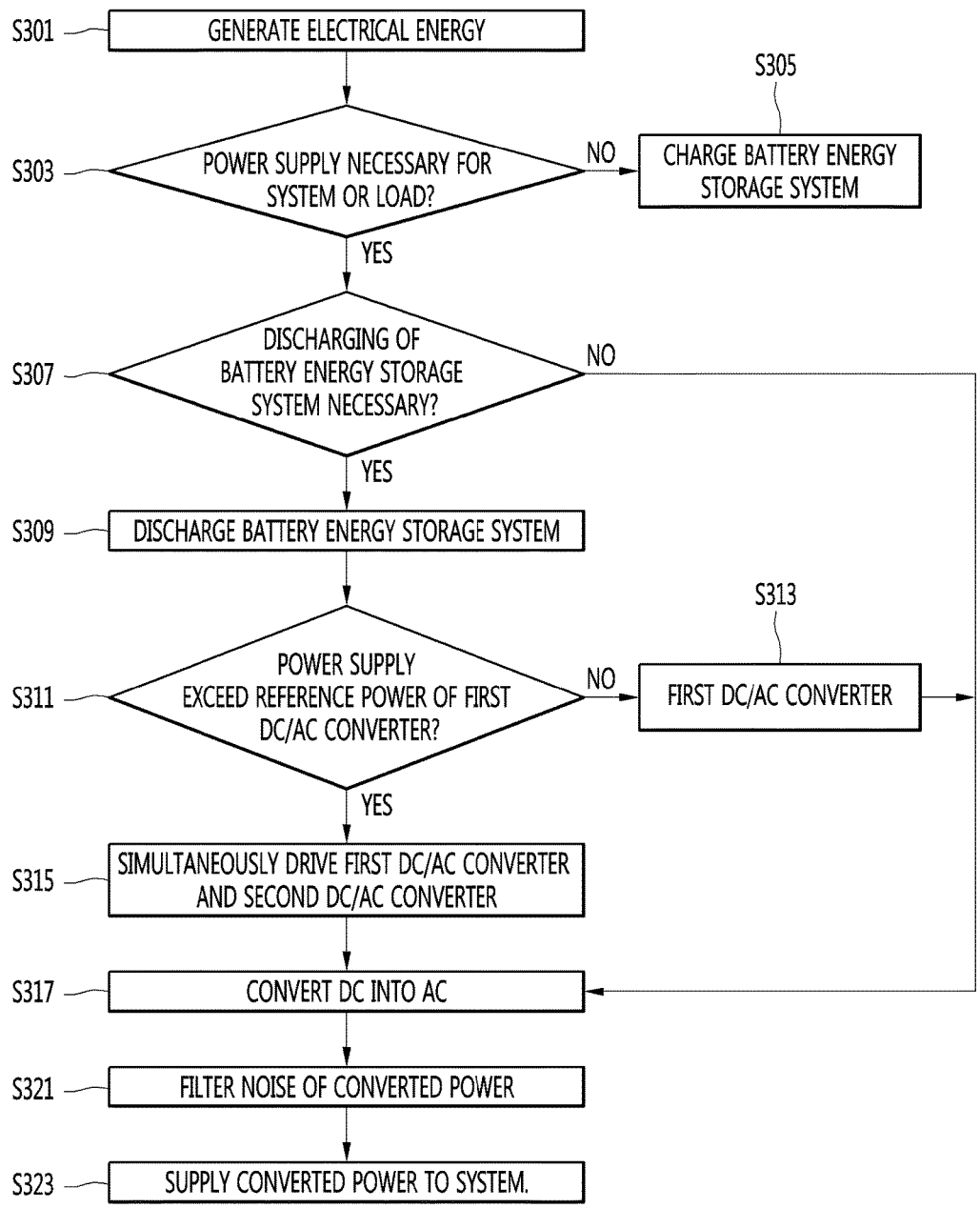
FIG. 7 is an operation flowchart of a power supply system according to another embodiment of the present invention.

FIG. 7 is an operation flowchart of a power supply system according to another embodiment of the present invention.

The electricity generation device 501 generates electrical energy in operation S301. However, if the power supply system 500 does not include the electricity generation device 501, such an operation may be omitted.

The system control unit 517 determines whether power supply is required for the system 509 or the load 521 in operation S303. Whether power supply is required for the system 509 or the load 521 may be determined on the base of whether the system 509 or the load 521 is overloaded or lightly overloaded.

If power supply is not required for the system 509 or the load 521, the charging control unit 513 allows the power generated by an external power or the electricity generation device 501 to charge the BESS 113 in operation S305.

If power supply is required for the system 509 or the load 521, the charging control unit 513 determines whether discharging of the BESS 515 is required in operation S307. As the power demand of the system 509 or the load 521 is not satisfied with only the electrical energy supplied by the electricity generation device 501, whether discharging of the BESS 500 is required is determined. However, if the power supply system 500 does not include the electricity generation device 501, such a determination may be omitted. Additionally, the charging control unit 513 may determine whether the BESS 515 stores electrical energy sufficient for discharging.

If discharging of the BESS 515 is required, the charging control unit 513 discharges the BESS 515 in operation S309.

The system control unit 517 determines whether the power supplied by the BESS 515 exceeds a reference power of the first DC/AC converter 503 in operation S311. Since the maximum efficiency is provided when a DC/AC converter uses power that is 70% to 90% of the rated power thereof, the system control unit 517 may set the size of a supply power for the first DC/AC converter 503, which allows the first DC/AC converter 503 to use 70% to 90% of the rated power, to a reference power. Preferably, the system control unit 517 may set a supply power for allowing the first DC/AC converter 503 to use 80% of the rated power to a reference power. At this point, the supply power includes power discharged by the BESS 515 in addition to power supplied by the electricity generation device 501.

If the power supplied by the electricity generation device 501 and the BESS 515 does not exceed the reference power of the first DC/AC converter 503, the system control unit 517 drives only the first DC/AC converter 503 in operation S313. The rated power of the first DC/AC converter 503 is smaller than the rated power of the DC/AC converter in the embodiments of FIGS. 1 to 3 using one DC/AC converter. Accordingly, if the power generated by the electricity generation device 501 is small, the electricity generation device 501 may easily supply power to allow the first DC/AC converter 503 to use power that is 70% to 90% of the rated power. For example, when the power supply system 500 is a solar power supply system, if the power generated by a solar cell array is small due to a low solar irradiation, the solar cell array may easily supply power to allow the first DC/AC converter 503 to use power that is 70% to 90% of the rated power.

If the power supplied by the electricity generation device 501 and the BESS 515 exceeds the reference power of the first DC/AC converter 503, the system control unit 517 simultaneously drives both the first DC/AC converter 503 and the second DC/AC converter 519 in operation S315. The system control unit 517 drives the first DC/AC converter 503 by supplying the power corresponding to the size of the reference power to the first DC/AC converter 503. Accordingly, the first DC/AC converter 503 may use power within 70% to 90% of the rated power. Therefore, the first DC/AC converter 503 may efficiently convert DC power into AC power. Additionally, as the total harmonics distortion of the converted power is lowered by the first DC/AC converter 503, the quality of power may be improved. The system control unit 517 may drive the second DC/AC converter 519 by supplying the remaining power after supplied to the first DC/AC converter 503 to the second DC/AC converter 519.

The first DC/AC converter 503 and the second DC/AC converter 519 convert the electrical energy discharged by the second DC/AC converter or the electrical energy converted by the electricity generation device 501 into AC in operation S317.

The AC filter 505 filters the noise of converted power in operation S319.

The power supply system 500 supplies the filtered power to the system 509 or the load 521 in operation S323.

According to such operations, the power supply system 500 may directly charge the BESS 515 without converting the DC power supplied by the electricity generation device 501 into AC power. Additionally, through such operations, the power supply system 500 may selectively drive a plurality of DC/AC converters on the basis of the size of power supplied.

Figure 8:
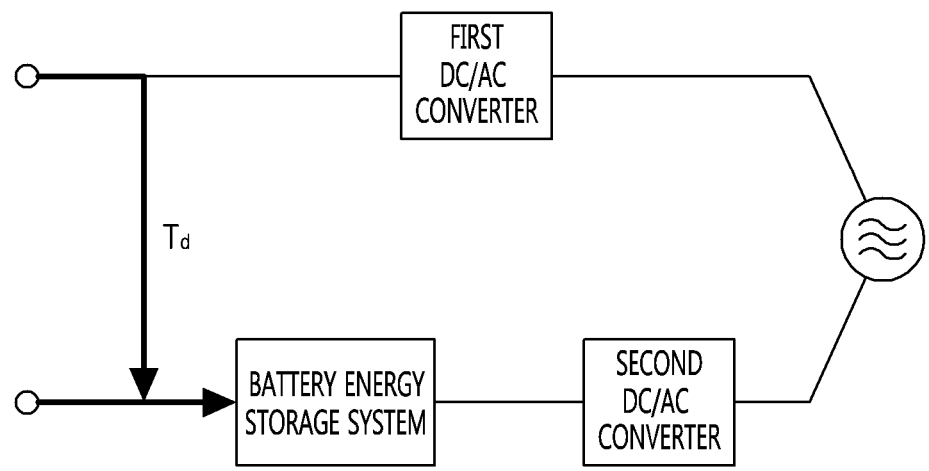
FIG. 8 illustrates the flow of power supply when a system control unit charges a BESS according to another embodiment of the present invention.

FIG. 8 illustrates the flow of power supply when the system control unit 517 charges a BESS according to another embodiment of the present invention.

As described with reference to the flowchart of FIG. 7, if power supply is not required for the system 509 or the load 521, the charging control unit 513 performs a control to charge the BESS 515 with the electrical energy generated by the electricity generation device 501 or the electrical energy supplied by an external power source.

Figure 9:
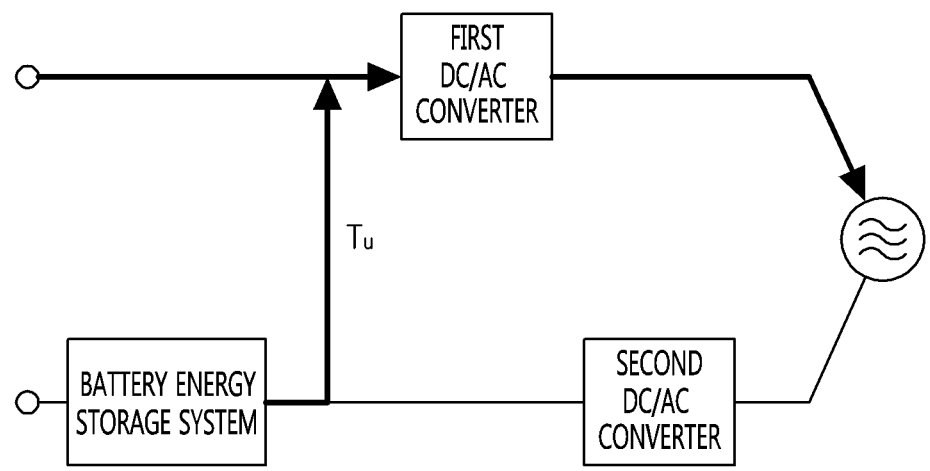
FIG. 9 illustrates the flow of power supply when a system control unit drives only a first DC/AC converter according to another embodiment of the present invention.
Figure 10:
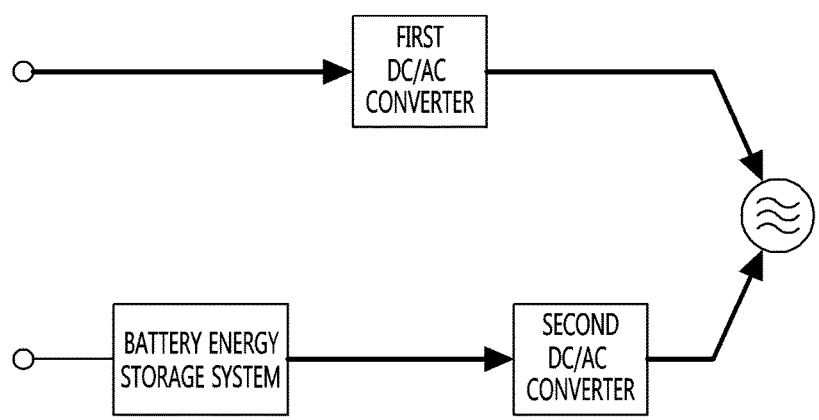
FIG. 10 illustrates the flow of power supply when a system control unit drives a first DC/AC converter and a second DC/AC converter at the same time according to another embodiment of the present invention.

As described with reference to the flowchart of FIG. 7, FIGS. 9 and 10 illustrate the flow of power supply when power supply is required for the system 509 or the load 521 and discharging of the control unit 517 in a BESS is required.

FIG. 9 illustrates the flow of power supply when the system control unit 517 drives only a first DC/AC converter according to another embodiment of the present invention.

If the power supplied by the electricity generation device 501 and the BESS 515 does not exceed the reference power of the first DC/AC converter 503, the charging control unit 513 allows the electricity generation device 501 and the BESS 515 to supply power to the first DC/AC converter 503 at the same time. In this case, the system control unit 517 drives only the first DC/AC converter 503.

FIG. 10 illustrates the flow of power supply when the system control unit 517 drives a first DC/AC converter and a second DC/AC converter at the same time according to another embodiment of the present invention.

If the power supplied by the electricity generation device 501 and the BESS 515 exceeds the reference power of the first DC/AC converter 503, the charging control unit 513 allows the electricity generation device 501 to supply power to the first DC/AC converter 503 and supply power to the second DC/AC converter 519. In this case, the system control unit 517 drives both the first DC/AC converter 503 and the second DC/AC converter 519.

Figure 11:
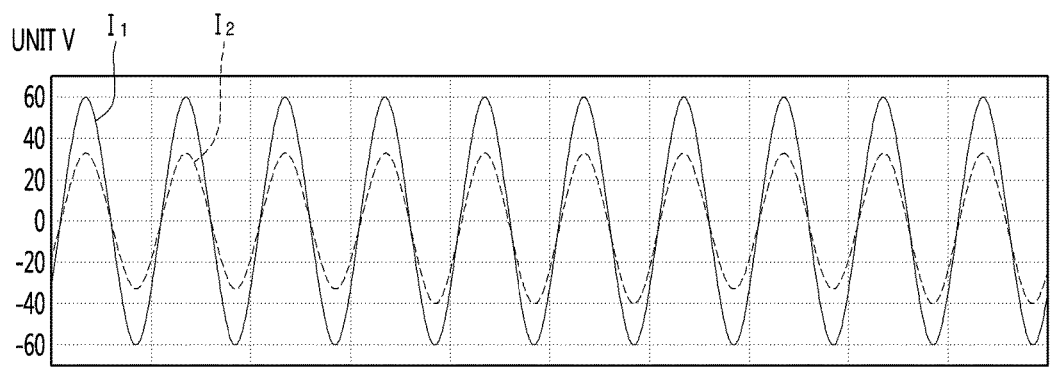
FIG. 11 is a graph illustrating an output current of a first DC/AC converter and a second DC/AC converter when the first DC/AC converter and the second DC/AC converter are driven simultaneously according to another embodiment of the present invention.

FIG. 11 is a graph illustrating an output current of a first DC/AC converter and a second DC/AC converter when the first DC/AC converter and the second DC/AC converter are driven simultaneously according to another embodiment of the present invention.

In the graph of FIG. 11, I1 is an output current of the first DC/AC converter 503 and I2 is an output current of the second DC/AC converter 519. It is seen that a frequency of an output current of the first DC/AC converter 503 is identical to a frequency of an output current of the second DC/AC converter 519. Accordingly, if the frequencies of power outputted by a plurality of DC/AC converters are the same when the power supply system 500 supplies power to the system 509 or the load 521 by using the plurality of DC/AC converters, two currents are combined without difficulties.

Since a power supply system is operated by efficiently adjusting the power supplied to a DC/AC converter of the power supply system, the power conversion efficiency of an electricity generation device is improved and the quality of power may be improved by lowering the Total Harmonic Distortion (THD) of current.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply system comprising:
    an electricity generation device configured to generate electrical energy;
    a battery energy storage system (BESS) configured to receive and charge the electrical energy supplied from the electricity generation device, and output the charged electrical energy,
    a first DC/AC converter configured to convert electrical energy supplied from the electricity generation device or the BESS into AC;
    a second DC/AC converter configured to convert electrical energy supplied from the BESS into AC; and
    a control unit configured to (1) determine a number of driving DC/AC converters by comparing a size of a DC power supplied by the BESS with a size of a reference power, (2) determine at least one DC/AC converter to be driven in correspondence to the number of the driving DC/AC converters among the first DC/AC converter and the second DC/AC converter, and (3) control the determined at least one DC/AC converter to be driven.

2. The power supply system according to claim 1, wherein the reference power is determined based on a rated power of the first DC/AC converter.

3. The power supply system according to claim 1, wherein the reference power has a size of supply power for the first DC/AC converter, which allows the first DC/AC converter to use a power of 70% to 90% of the rated power of the first DC/AC converter.

4. The power supply system according to claim 1, wherein the system control unit simultaneously drives the first DC/AC converter and the second DC/AC converter when a DC power supplied by the electricity generation device exceeds the reference power.

5. The power supply system according to claim 1, wherein the system control unit drives only one of the first DC/AC and second DC/AC converters when a DC power supplied by the electricity generation device does not exceed the reference power.

6. The power supply system according to claim 1, further comprising a DC/DC converter configured to convert a voltage size of electrical energy for charging the battery energy system as connected to the BESS.

* * * * *